United States Patent [19]
Hertl et al.

[11] Patent Number: 4,578,323
[45] Date of Patent: Mar. 25, 1986

[54] FUEL CELL USING QUINONES TO OXIDIZE HYDROXYLIC COMPOUNDS

[75] Inventors: William Hertl, Corning; Robert G. Schaeffler, Elmira, both of N.Y.

[73] Assignee: Corning Glass Works, Corning, N.Y.

[21] Appl. No.: 544,279

[22] Filed: Oct. 21, 1983

[51] Int. Cl.$^4$ .................... H01M 8/20; H01M 8/22
[52] U.S. Cl. ..................................... 429/15; 429/46; 429/111
[58] Field of Search ............... 429/111, 15, 46, 19

[56] References Cited

U.S. PATENT DOCUMENTS

| | | | |
|---|---|---|---|
| 3,294,588 | 12/1966 | Beltzer et al. | 429/46 |
| 3,300,342 | 1/1967 | Klass | 429/15 |
| 3,682,704 | 8/1972 | Keefer | 429/19 |
| 3,920,692 | 11/1975 | Wiersdorff et al. | 260/245.91 |
| 4,022,950 | 5/1977 | Fong et al. | 429/111 |
| 4,117,202 | 9/1978 | Beck | 429/2 |

OTHER PUBLICATIONS

C. F. Wells, "Hydrogen Transfer to Quinones", Transactions of the Faraday Society 57, 1961, pp. 1703 et seq.
Y. C. Wan and A. C. C. Tseung, "Some Studies Related to Electricity Generation From Biological Fuel Cells and Galvanic Cells, in vitro and in vivo", Medical and Biological Engineering, Jan., 1974, pp. 14 et seq.
J. R. Rao, et al., "Metal-Oxygen and Glucose-Oxygen Cells for Implantable Devices", Biomedical Engineering, Mar., 1974, pp. 98 et seq.

*Primary Examiner*—Donald L. Walton
*Attorney, Agent, or Firm*—B. D. Voyce

[57] ABSTRACT

The present invention relates to fuel cells. More particularly, it relates to a fuel cell which produces electricity from the anaerobic oxidation of hydroxylic compounds, e.g. alcohols and sugars, in the presence of a quinone.

17 Claims, 4 Drawing Figures

FUEL CELL USING QUINONES TO OXIDIZE HYDROXYLIC COMPOUNDS

TECHNICAL FIELD

The present invention relates to fuel cells. More particularly, it relates to a fuel cell which produces electricity from the anaerobic oxidation of hydroxylic compounds, e.g. alcohols and sugars, in the presence of a quinone.

BACKGROUND ART

The oxidation of alcohols in the presence of a photoexcited quinone was discussed in an article by C. F. Wells, "Hydrogen Transfer to Quinones", Transactions of the Faraday Society, 57, 1961, pp 1703 et. seq. In a cylindrical quartz cell, a solution of isopropyl alcohol and sodium anthraquinone-2-sulfonate was shaken in the presence of oxygen while being irradiated by 365 nanometer light. The alcohol was oxidized to acetone, and hydrogen peroxide was formed. The oxygen uptake and the peroxide product were measured to determine the reaction sequence.

The use of glucose and oxygen as reactants for a biological fuel cell implantable in a human was disclosed in an article written by V. C. Wan and A. C. C. Tseung, "Some Studies Related to Electricity Generation from Biological Fuel Cells and Galvanic Cells, in vitro and in vivo", Medical and Biological Engineering, January, 1974, page 14 et. seq. The fuel cell was constructed as follows: a separaate anaerobic oxidation half cell is filled with a glucose and salt solution; a separate aerobic reduction half cell is filled with a salt solution, a porous glass plug connects the half cells; and either platinum or platinized electrodes are immersed in the half cells. The authors state that in order for the glucose/oxygen cell to be attractive, specific catalytic electrodes for glucose oxidation and oxygen reduction must be developed.

A glucose-oxygen biofuel cell was also disclosed in an article by J. R. Rao et al., "Metal-oxygen and Glucose-oxygen Cells for Implantable Devices", Biomedical Engineering, March, 1974, page 98 et seq. The authors noted that previous attempts at creating an implantable biofuel cell attempted to separate the glucose and oxygen naturally found in body fluids by means of selective membrane chambers around the electrodes. However, the authors developed a cell having a nonselective glucose electrode (platinum black), two selective porous oxygen electrodes (activated carbon), the electrodes being separated by hydrophilic membranes permeable to oxygen and glucose.

DISCLOSURE OF THE INVENTION

The present invention is a fuel cell novel in both design and method. First, the structure of this cell will be disclosed. Then, the operation of the cell will be discussed, pointing out the significant advances and advantages.

As with other designs, the present cell comprises separate oxidation and reduction half-cells, and a means for ions to flow between them.

The oxidation half cell comprises a cell chamber capable of maintaining anaerobic conditions, an electron donor fuel solution, and an electrode. The cell chamber contains the electron donor fuel solution which is electrically conductive having an effective amount of an electron-accepting quinone compound and, as a fuel, an electron-donating hydroxylic compound. The electrode is in contact with the fuel solution in order to accept electrons.

The reduction half cell also has a cell chamber, but it is capable of maintaining either aerobic or anaerobic conditions. Within the chamber is an electrically conductive solution and an electrode contacting the solution. The reduction half cell is joined to the oxidation half cell by a conventional means for physically separating the respective solutions while providing an ionic conductivity between them.

The operation of the fuel cell is believed to be straightforward, but it can be run in two different ways. Where the fuel used has a greater affinity for its electrons than the quinone compound in its ground state, the oxidation half cell mixture must be irradiated with light energy. The quinone compound becomes excited, strips electrons from the fuel donor (oxidizing the fuel), and in turn is oxidized to its ground state by releasing the extra electrons to the electrode. Meanwhile in the reduction half cell the oxygen is reduced to hydroxyl ions at the electrode when in an aerobic environment, and to hydrogen gas when in an anaerobic environment with a platinum electrode.

The need for irradiation of the oxidation half cell is eliminated when the quinone compound in its ground state has a greater affinity for electrons than the fuel does for its own electrons. For example, polyhydroxylic compounds such as reducing sugars are stripped of electrons by quinone compounds even when in the dark. As in the first operational mode, once reduced, the quinone compound is reoxidized by releasing the electrons to the electrode. It should be noted that although certain fuels do not require light irradiation, the redox rate of reaction and hence the cell current, will be increased in proportion to the light energy available.

The present fuel cell requires anaerobic conditions for the oxidation half cell, regardless of whether it is irradiated. If any substantial amount of oxygen is present, the cell will quench. The combination of oxygen, water, and a ready electron source (the excited quinone) results in the formation of hydrogen peroxide. No or few electrons are made available to the electrode for a current source.

An improved fuel cell uses a quinone compound in the reduction half cell as well. When the quinone compound is present, the oxygen reduction reaction occurs much faster. The cell current is increased severalfold. It is believed that the electrode gives up electrons and reduces the quinone. When operated in an aerobic mode, oxygen is reduced to hydrogen peroxide when the quinone transfers electrons to it. However, in an anaerobic mode with a platinum electrode the quinone transfers electrons to the hydronium ion, reducing it to hydrogen gas.

In some embodiments, the fuel source for the cell will be natural products, e.g., molasses, cane sugar, lignesite, Kraft black liquor, and beet sugar juice. Better performances with the products often can be obtained by enzymatically pretreating these products into more readily oxidized compounds. Suitable hydrolytic enzymes are invertase, maltase, amylase, lactase.

The use of ambient light and hydroxylic fuels in the instant invention has several advantages. First is the salient benefit. Electricity is produced from natural, comparatively inexpensive materials that in many cases are unwanted byproducts or outright waste. The "hidden" advantage is that in producing current one also synthesizes desirable oxidation products of the starting hydroxylic compounds. There is even no need to control the voltage during the synthesis, as in conventional electrochemical techniques.

BEST MODE OF CARRYING OUT THE INVENTION

Figure 1:
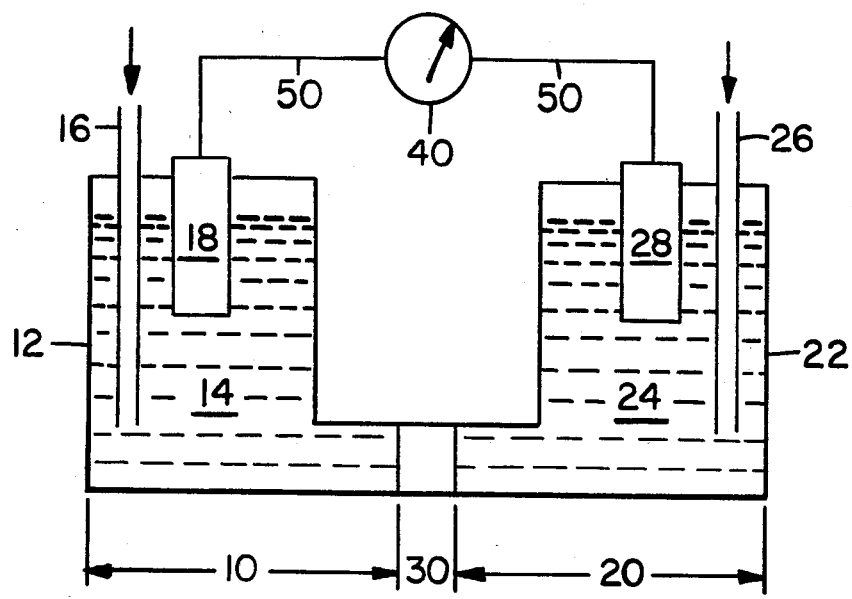
FIG. 1 is a schematic of the present fuel cell.

The present fuel cell is illustrated in FIG. 1. The major subunits are the oxidation half cell 10, the reduction half cell 20, a means for permitting ions to flow between the half cells 30. Potential and current measurement means for the fuel cell is included 40, being connected between the half cell electrodes by conventional means 50, e.g., copper wires.

The oxidation half cell 10 comprises a fuel cell chamber 12 capable of holding a donor fuel solution 14 under anaerobic conditions. To this end, the cell can have a means for maintaining an anaerobic environment 16, such as a non-oxygen gas bubbler. Alternatively the cell could be made air-tight before being purged of oxygen. An electrode 18 contacts the donor fuel solution 14. It can be made with a catalytic metal such as platinum or rhodium, but it can also be made of carbon, e.g., carbon felt or graphite.

Suitable fuel solutions comprise effective amounts of an electron-accepting quinone compound and an electron-donating hydroxylic compound. Quinone compounds useful in the oxidation half cell include anthraquinone (AQ), anthraquinone 1,5 disulfonic acid (A1DA), anthraquinone-2,6-disulfonic acid (A2DA), anthraquinone-2-sulfonic acid (A2SA), and benzoquinone. However, the preferred quinone compounds are A2DA and A2SA. These have been shown by cyclic voltammogram studies to be electrochemically reversible. AS2A and A2DA have the advantage of being photoactive.

The donor fuels are all organic compounds having attached hydroxyl groups which can donate an electron, and thus, be oxidized. The list includes alcohols (primary, secondary, and tertiary), glycols, glycerols, hydrolized cellulose, lignosite, sugars, and other carbohydrates. In fact, one of the advantages of the present invention is that its fuel tolerance ranges from methanol, to beet sugar, to molasses. Of course, the total power output and economic cost of the cell varies with the fuel used. In some cases the fuel is derived from enzyme treatment of a natural material. Examples are amylase treated starch, and invertase treated sucrose, or molasses. Thus, materials not ordinarily useful in this fuel cell, starch, can be converted into a fuel.

The reduction half cell also comprises a fuel cell chamber 22, capable of holding a solution 24 which is electrically conductive and the gaseous condition is either aerobic or anaerobic. Thus, the cell can have a means for maintaining either aerobic or anaerobic environments 26, such as, respectively either, an oxygen or a nitrogen gas bubbler. A reduction electrode 28 contacts the solution 24. It can be made just like the oxidation electrodes described above.

A suitable conductive solution comprises an ionic salt. The selection of these compounds and the appropriate concentrations is known to those of skill in the art. It has been found that the addition of an electron-accepting quinone to the solution, particularly A2SA, is most beneficial. In both anaerobic and aerobic conditions the current flow between oxidation and reduction half cells is increased.

Between the half cells is the means for permitting ions to flow between them. Conventional means such as agar-coated glass frits are suitable. Other means are known to those of skill in the art.

Photoexcitation

As noted above, the present fuel cell has two modes of operation. Some donor fuels, such as the lower molecular weight alcohols, require photoexcitation of the quinone compound in order to be oxidized and produce electricity. However others, such as reducing sugars, do not need a light source.

One of the advantages of the present cell is that when photoexcitation is used, this photocell works with visible light. Incident visible light beams of varying wavelengths have been tested in this photocell. Current is produced at about 470 nanometers on down to at least 375 nanometers.

Cell Operation

While the basic operation of the cell has been described above, the effect of various parameters on that operation has not. This section will present the effects of pH, donor fuel concentration, and quinone concentration. The data described is achieved on a fuel cell as described above. The current and voltage are measured on conventional measuring means.

Figure 2:
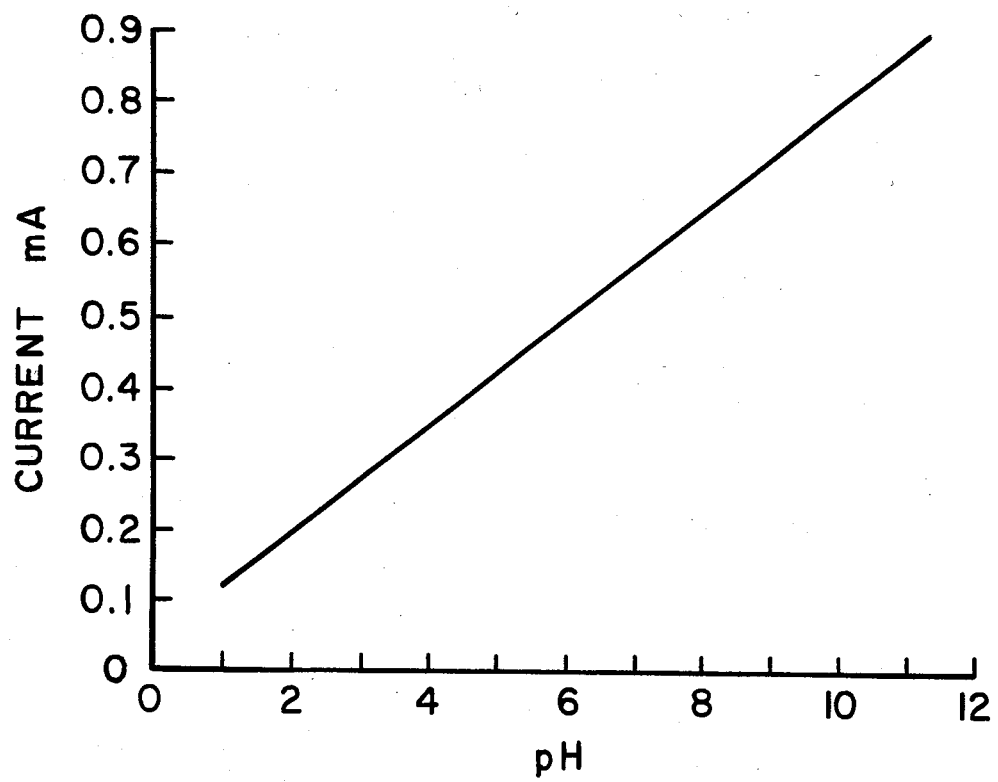
FIG. 2 is a graph showing the effect of pH in the oxidation half cell on current from the cell.

The oxidation of the fuel is often carried out in a highly basic environment (pH 12), but it can take place even in an acidic environment. FIG. 2 shows the effect of pH on producing current. The fuel solution is a 10% by weight ethylene glycol solution with 6 millimolar AS2A. The current is a direct linear function of pH up to pH 12. Above that level (not shown) the currents increase at a slower rate.

Figure 3:
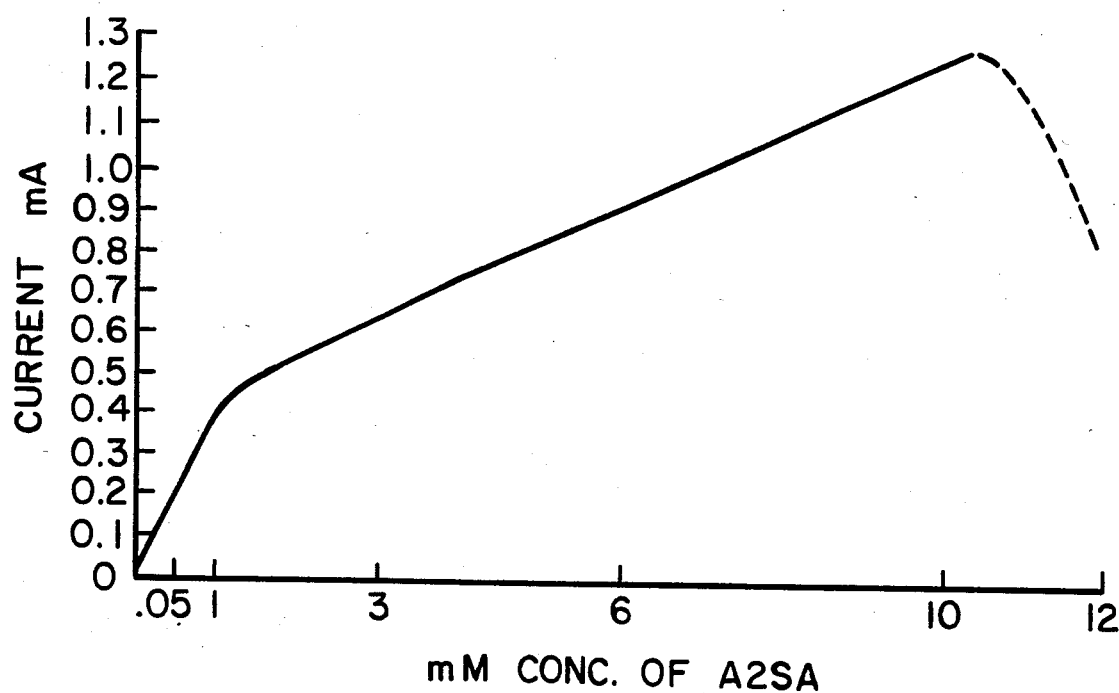
FIG. 3 is a graph showing the effect of quinone concentration in the oxidation half cell on current from the cell.

FIG. 3 relates the effect of quinone concentration on current. The fuel solution has a pH of 12.0, 25% ethylene glycol and A2SA varying in concentration to its solubility limit of 20 millimoles. The current varies directly with the quinone concentration, though not in a linear fashion.

Figure 4:
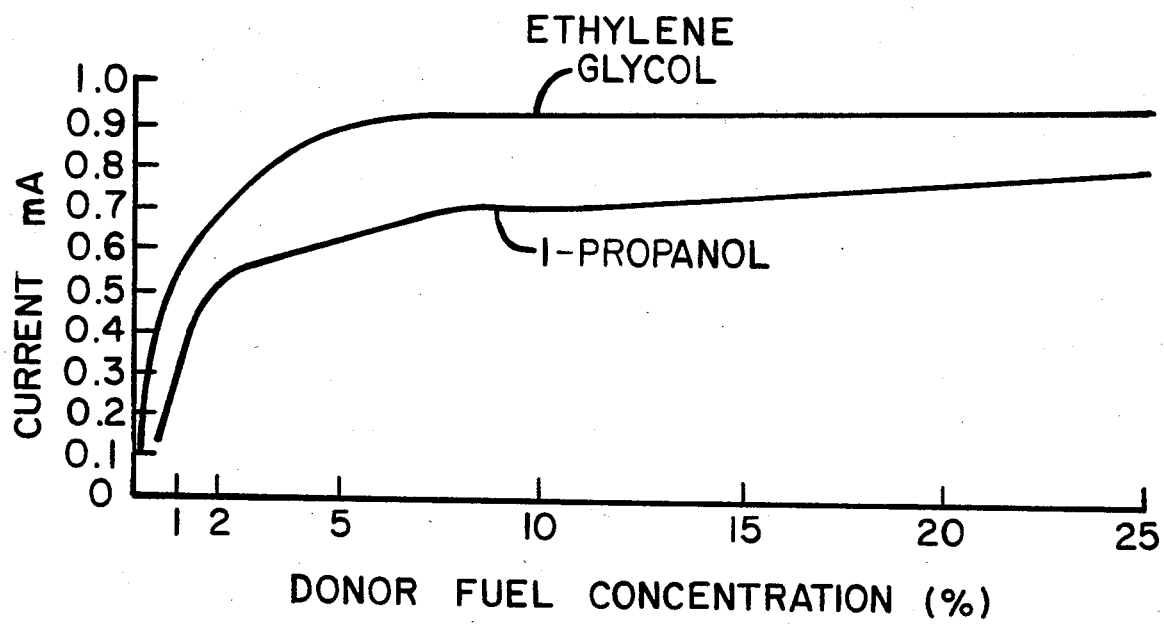
FIG. 4 is a graph showing the effect of donor fuel concentration in the oxidation half cell on current from the cell.

Finally the effect of donor fuel concentration is shown in FIG. 4. The oxidation fuel cell solution had 8 millimolar A2SA, a pH of 12.0, and varying concentrations of either n-propanol or ethylene glycol. Initially, current varies directly with donor fuel concentration, but beyond a 5-10% (v/v) level there is little increase in current. It should be noted that the finite current observed at 0% concentration was due to A2SA degradation which occurs in the absence of a donor fuel.

Donor Fuel Performance

Various naturally occurring, polyhydroxylic compounds have been tested for their fuel potential. A fuel cell of the present invention is operated as follows, unless otherwise noted:

| Oxidation Half Cell | Reduction Half Cell |
| --- | --- |
| 5% w/v Donor Fuel | 3 mM A2SA |
| 3 mM A2SA | 0.1 M KCl |
| 0.1 M KCl | pH 1.66 |
| pH 12.2 | Carbon Electrode |
| Carbon Electrode | Aerobic ($O_2$) |
| Anerobic ($N_2$) | |

Current Comparison

The natural fuels give the following amperage in the present fuel cell:

| Donor | Current (mA) |
| --- | --- |
| Glycerol (reference) | 0.54 |
| Cellulose-Acid Hydrolyzed | 0.08 |
| Sucrose | 0.40 |
| Sugar Beet Juice* | 1.20 |
| Lignesite | 3.68 |
| Molasses-Food Grade* | 5.30 |
| Sucrose-Acid Hydrolyzed | 5.38 |
| Molasses-Black Strap* | 6.10 |
| Dextrose | 6.12 |

*Diluted to 5% solutes.

Fuel Performance Comparison

In order to more fully evaluate their performance, both treated and untreated, natural fuels have been tested for maximum current, maximum power output, and as an efficiency parameter, pounds of fuel per kilowatt-hour. The results are as follows:

| Fuel | Treatment | max.i (mA) | max.P (mW) | Lbs./kwh @ max.P | Lbs./kwh @ 50% P |
| --- | --- | --- | --- | --- | --- |
| Potato Starch | G. Amylase + α Amylase + Maltase | 16.2 | 4.1 | 8.3 | 4.85 |
| Potato Starch | G. Amylase | 11.5 | 4.1 | 8.8 | 5.6 |
| Sucrose | Invertase | 18.6 | 3.83 | 6.1 | 3.75 |
| Molasses | Invertase | 17.5 | 2.69 | 8.47 | 4.73 |
| Molasses | — | 10 | 2.75 | 25.7 | 17.5 |
| Dextrose | — | 30 | 5.13 | 6.4 | 3.74 |
| Lignosite | — | 3 | 2.50 | 11.9 | 7.3 |

Fuel Cell Products

The oxidation products for various fuels can be of particular interest. For example, glucose can be oxidized into the following compounds: glucosone, gluconic acid, glucuronic acid, glucaric acid, and gluconolactone. Alcohols can form aldehydes and ketones, e.g., acetone from isopropanol. Thus it can be seen that by selecting a particular fuel, one of skill in the art can harvest a corresponding oxidation product.

Having described the invention with particular reference to preferred embodiments, it will be obvious to those skilled in the art to which the invention pertains, that, after understanding the invention, various changes and modifications may be made without departing from the spirit and scope of the invention as defined by the appended claims.

We claim:

1. A chemical fuel cell capable of producing electricity from organic compounds and forming oxidation products thereof, having separate oxidation and reduction half cells and a means for separating the half cells while permitting ions to flow between the half cells is characterized by:
   (a) an anaerobic oxidation half cell comprising:
      (i) an electrically conductive, electron donor fuel solution having an effective amount of an electron-accepting, quinone compound and an electron-donating polyhydroxylic organic compound;
      (ii) a cell chamber for containing the fuel solution; and
      (iii) an electrode contacting the fuel solution; and
   (b) a reduction half cell comprising:
      (i) an electrically conductive, ionic solution;
      (ii) a cell chamber for containing the ionic solution; and
      (iii) an electrode contacting the ionic solution;
   whereby the polyhydroxylic compound is oxidized and an electrical potential exists between the electrodes.

2. The fuel cell of claim 1 wherein the electron donating, polyhydroxylic organic compound in the fuel solution is selected from sugars, glycols, glycerols, or carbohydrates.

3. The fuel cell of claim 1 wherein the electron-accepting quinone compound is selected from sulfoanthraquinones, anthraquinone, benzoquinone.

4. The fuel cell of claim 3 wherein the quinone compound is anthraquinone -2-sulfonic acid or anthraquinone-2,6-disulfonic acid.

5. The fuel cell of claim 1 wherein the ionic solution has an effective amount of an electron accepting quinone compound.

6. The fuel cell of claim 5 wherein the quinone compound is anthraquinone 2-sulfonic acid or anthraquinone-2,6-disulfonic acid.

7. The fuel cell of claim 1 wherein the oxidation electrode is carbonaceous.

8. A photo-chemical fuel cell capable of producing electricity from organic compounds and forming oxidation products thereof, having separate oxidation and reduction half cells and a means for separating the half cells while permitting ions to flow between the half cells and a light source for irradiating the oxidation half cell is characterized by:
   (a) an anaerobic oxidation half cell comprising:
      (i) an electrically conductive, electron donor fuel solution having an effective amount of an electron-accepting, quinone compound and an electron-donating, hydroxylic organic compound;
      (ii) a cell chamber for containing the fuel solution; and
      (iii) an electrode contacting the fuel solution; and
   (b) a reduction half cell comprising:
      (i) an electrically conductive, ionic solution;
      (ii) a cell chamber for containing the ionic solution; and
      (iii) an electrode contacting the ionic solution;
   whereby when the light source irradiates the electron donor solution, the hydroxylic compound is oxidized, and an electrical potential exists between the electrodes.

9. The fuel cell of claim 8 wherein the light is visible light.

10. The fuel cell of claim 8 wherein the electron-donating, hydroxylic organic compound is selected from alcohols, sugars, glycerols, glycols, or carbohydrates.

11. The fuel cell of claim 8 wherein the electron-accepting quinone compound is selected from sulfoanthraquinones, anthraquinone, or benzoquinone.

12. The fuel cell of claim 11 wherein the quinone compound is anthraquinone -2-sulfonic acid or anthraquinone-2,6-disulfonic acid.

13. The fuel cell of claim 8 wherein the ionic solution has an effective amount of an electron accepting quinone compound.

14. The fuel cell of claim 13 wherein the quinone compound is anthraquinone 2-sulfonic acid or anthraquinone-2,6-disulfonic acid.

15. The fuel cell of claim 8 wherein the oxidation electrode is carbonaceous.

16. A process for producing electricity from organic compounds and oxidation products thereof comprises:
   (a) combining anaerobically an electron-donating polyhydroxylic organic compound with an effective amount of an electron-accepting quinone compound and an ionic salt form an electron donor fuel solution;
   (b) contacting an electrode with the anaerobic fuel solution;
   (c) preparing an electrically conductive ionic solution;
   (d) contacting a second electrode with the ionic solution; and
   (e) connecting the ionic solution to the fuel solution with a means which separates the solutions, but permits ions to flow between the solutions;
   whereby electricity can flow between the electrodes when they are connected by a conductive means.

17. A process for producing electricity from organic compounds comprises:
   (a) combining anaerobically an electron-donating hydroxylic organic compound with an effective amount of an electron-accepting quinone compound to form an electron donor fuel solution;
   (b) contacting an electrode with the anaerobic fuel solution;
   (c) preparing an electrically conductive ionic solution;
   (d) contacting a second electrode with the ionic solution;
   (e) connecting the ionic solution to the fuel solution with a means which separates the solutions, but permits ions to flow between the solutions; and
   (f) irradiating the fuel solution with light of a sufficient energy to oxidize the hydroxylic compound;
   whereby electricity can flow between the electrodes when they are connected by a conductive means.

* * * * *